(12) United States Patent
Klug et al.

(10) Patent No.: US 11,636,357 B2
(45) Date of Patent: Apr. 25, 2023

(54) USE OF MACHINE LEARNING TO IDENTIFY TOPICAL ARGUMENTS

(71) Applicant: Airin, Inc., Park City, UT (US)

(72) Inventors: Linda Klug, Park City, UT (US); Elisha Davidson, Sandy, UT (US); Nikolay Gradetskiy, Salt Lake City, UT (US)

(73) Assignee: Airin, Inc., Park City, UT (US)

( * ) Notice: Subject to any disclaimer, the term of this patent is extended or adjusted under 35 U.S.C. 154(b) by 557 days.

(21) Appl. No.: 16/862,493

(22) Filed: Apr. 29, 2020

(65) Prior Publication Data

US 2021/0342708 A1    Nov. 4, 2021

(51) Int. Cl.
```
G06F 16/00    (2019.01)
G06N 5/04     (2023.01)
G06F 40/30    (2020.01)
G06N 20/00    (2019.01)
G06F 16/22    (2019.01)
```

(52) U.S. Cl.
CPC .......... *G06N 5/04* (2013.01); *G06F 16/2246* (2019.01); *G06F 40/30* (2020.01); *G06N 20/00* (2019.01)

(58) Field of Classification Search
None
See application file for complete search history.

(56) References Cited

U.S. PATENT DOCUMENTS

| 8,185,482 B2 | 5/2012 | Yang et al. |
| 10,380,246 B2 | 8/2019 | Clark et al. |
| 2013/0144890 A1* | 6/2013 | Liu ........................ G06Q 10/10 707/E17.069 |
| 2014/0136521 A1 | 5/2014 | Pappas |
| 2019/0347297 A1* | 11/2019 | Galitsky ............. G06F 16/9027 |
| 2019/0370604 A1 | 12/2019 | Galitsky |
| 2020/0097598 A1* | 3/2020 | Anderson ............. G06F 16/355 |

\* cited by examiner

*Primary Examiner* — Anhtai V Tran
(74) *Attorney, Agent, or Firm* — Thorpe North and Western, LLP

(57) ABSTRACT

Technology is described for identifying topical arguments to be provided in order to enable problem solving. The method can include a first operation of storing a topical problem statement at a root of a graph. A plurality of topical arguments may be stored in a plurality of argument nodes and user answers to the topical arguments in the graph. Another operation may be grouping the argument nodes into section groups that define a sub-topic linked by the graph to the topical problem statement. Additionally, use requests for the topical arguments in the graph may be tracked by recording access to the topical arguments. A use pattern of topical arguments may be identified by tracking use requests to the topical arguments. The use pattern may be processed using a machine learning model. Another operation may be sending an additional section group with topical arguments and user answers in the graph based in part on processing of the use pattern using the machine learning model to determine which additional section group to send to a requestor.

20 Claims, 8 Drawing Sheets

USE OF MACHINE LEARNING TO IDENTIFY TOPICAL ARGUMENTS

BACKGROUND

For decades, designers and developers of computing systems have wanted to use computers to solve complex knowledge-based problems and engineering issues that have typically needed a human expert to address the problems or issues. Since the 1990s and even as far back as the 1950s, computer scientists have devised complex rule systems, known as expert systems or artificial intelligence (AI) where logical implication engines or neural networks receive a number of measurable inputs and then provide a proposed solution to a complex problem. Other types of problem-solving computer systems have also been used to try to solve expert problems and address complex issues.

Examples of areas where computer systems are desired to be applied to solve problems in knowledge intensive domains include areas such as: computer technology, computing design, computing support, engineering and medicine. In medical problem solving, a number of inputs such as illness symptoms may be used to try to: diagnose illness, determine whether a patient has a specific disease, determine whether a patient is ready to be released from medical care or other similar expert medical diagnoses. Problem solving computer systems are also desired to be applied in areas such finding solutions to computer technical support problems. In addition, there have been desires to apply expert systems using rule-based systems or other types of AI processes to areas such as law, accounting, weather prediction and areas where an expert recommendation may be helpful.

The attempts to apply computer technology to such expert areas have been met with limited success. Even with the advent of machine learning systems that are trained using large bodies of statistical information, there are still great challenges in creating computing systems that mimic the knowledge of a human expert with a large body of knowledge gained over time.

DETAILED DESCRIPTION

Figure 1:
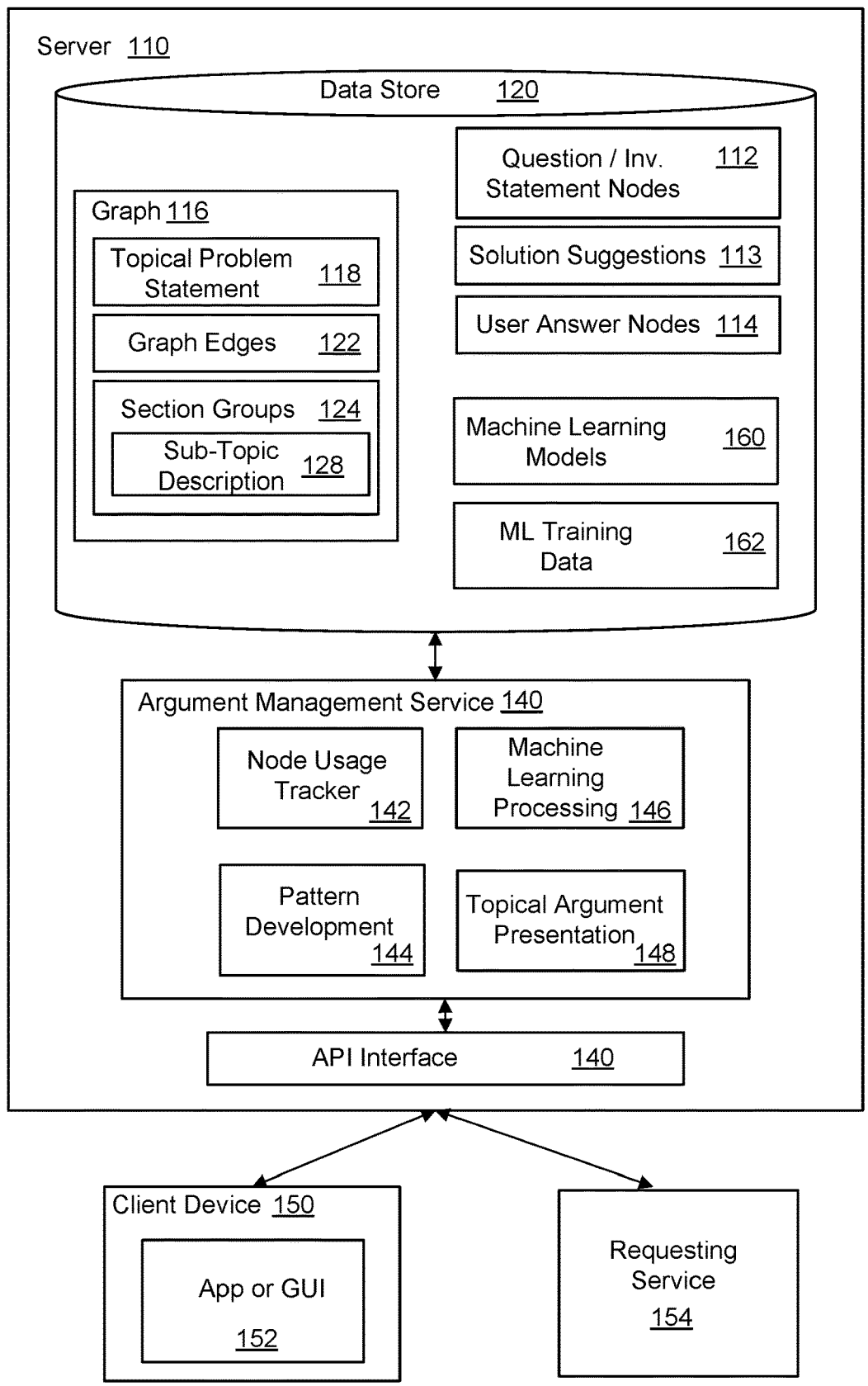
FIG. 1 is a block diagram illustrating an example of a system for identifying topical arguments to be presented to a user in order to enable the user to better address a problem or issue.

A technology is described for identifying and surfacing topical arguments which may be presented in a user interface or sent in response to API (application programming interface) calls in order to enable a user to better solve a problem or address a complex issue. The topical arguments may be questions or investigative statements related to the problem to be solved. The type of problem that is to be solved may be considered an expert problem where the problem has been solved in the past by a human expert that has amassed knowledge over a significant period of time (e.g., many months or years). The problem to be solved may also be a need that is to be addressed, such as designing a data center or selecting a software application for use by a client. The topical arguments may be questions or investigative statements that are related to the problem to be solved and/or a sub-problem related to the main problem.

This technology enables the prioritization and presentation of important topical arguments (i.e., questions and statements) to a user or human agent that may not be fully trained as an expert but may be trained enough to understand and use the topical arguments to better solve the problem or issue. When more important questions and statements have been identified, then these questions and investigative statements may be provided to the user, which may enable the expert problem to be more quickly and correctly solved.

The present technology provides systems and methods that capture how an expert thinks about a topic or problem and how an expert classifies and uses topical arguments (e.g., questions and investigative statements) to better solve a problem or issues related to the topic. Accordingly, the present technology provides an improved problem-solving model based on expert experience that is tailored to a specific problem case to assist the user in solving a problem or testing a hypothesis.

Knowledge gathered by an expert allows the expert to create a mental model or a mental structure of items or aspects to be explored to solve a problem in a specific domain or for a topic. An expert may ask questions or investigative statements to explore a problem or issue associated with a specific domain or topic. An expert can generate highly valuable questions (e.g., the right questions) to address an issue or solve a problem, and other experts can recognize the quality of the questions. The problems or issues to be solved may include problems like: correcting misconfigurations or errors in computers, defining an infrastructure for a data center, or investigating a medical disease.

This technology uses machine learning and/or analyzes patterns in the expert's use of questions and the machine learning and/or patterns may be used to select, prioritize and/or present topical arguments for human agents or users who have less expertise but may be able to address the issue or solve the problem when using the topical arguments. Quite often humans find it hard to identify good topical arguments, premises, questions to ask, or root issues to address in order to solve a problem, but often it is easier for humans to provide a solution once the correct question or topical argument is asked. Once the right premises are found, the solutions to the questions may often be straight forward.

In the past, developers of computer systems that have tried to solve domain type of problems have tried to find patterns in the answers to questions. In contrast, the present technology tracks patterns during the use of the expert's questions by an expert to present better questions and assist in determining how to solve a problem. Feeding a computing system with a massive amount of answers to questions to try to find the problem may not provide a faster or more accurate solution to an issue. However, providing human agents or users who are addressing an issue with better questions may often lead to faster and better problem solving. In addition, when the most relevant questions are provided, the questions can be used to address a topic or problem type for a longer period of time because the questions do not change as much as the solutions over time.

FIG. 1 illustrates a system to surface more relevant or more valuable topical arguments to a user or trained agent. The system may have at least one processor and a memory device. The memory device may include instructions that, when executed by the at least one processor, cause the system to present more valuable topical arguments to a user. FIG. 1 illustrates a data store 120 that is configured to store a topical problem statement 118 for a root of a graph 116. The graph 116 may reference a plurality of topical arguments in a plurality of question nodes 112 or investigative statement nodes 112. The topical arguments may be questions or statements to be investigated by the user or human agent. The graph may be arranged as a tree structure, a directed graph, an undirected graph, or other types of connected graphs with edges connecting the nodes.

Each of the topical arguments (e.g., with the topical argument or question/statement) may have an associated user answer node 114 that is associated with a topical argument using the context of the topical argument. The context may be defined by the graph topic, the topical problem statement 118 and/or a sub-topic where the topical argument is located in the graph 116. For example, the relationship between the topical arguments and the user answer nodes 114 may be 1 to many (1:M) and the user answers that are recorded for nodes in the graph may be stored and retrieved based on the context from the graph.

A user or human agent who is discussing a problem with a client may receive a user answer from the client (e.g., via voice, text, video, visually, etc.). The user may then enter or input the user answer from the client and that user answer may be stored in a user answer node 114. A user answer node 114 may be stored (e.g., via API requests or application operations) based on a context of the topical argument, a user problem solving session identifier, a user identifier and/or a customer identifier (e.g., an entity to which a user belongs). An example of a user answer may be, "Yes, port 25 in the operating system was already open."

Solution suggestions 113 may also be associated with a topical argument or question/investigative statement node 112. The solution suggestions in a solution suggestion node 113 may be retrieved and displayed (e.g., via API requests or application operations) based on the context where the topical argument is presented. The context may be defined by the graph selected or the location within a graph where the solution suggestion is to be presented or located. The solution suggestions may be displayed in a user interface with the topical argument, or the solution suggestions may be accessed via a user interface control that opens the solution suggestion(s) in a pop-up window, slide out window, revealed text box, etc. For example, the solution suggestion that might be retrieved for the question statement of "Has the right port been opened?" could be stated "Open up port 25 to provide appropriate network connectivity for e-mail routing."

In addition, the solution suggestion 113 for the topical arguments may be stored in individual solution suggestion nodes 113 which may be linked to topical arguments and the structure of the graph (e.g., a tree structure or other graph type). The solution suggestion has meaning and is linked to the questions or investigative statements based on the context of the overall graph as discussed above. For example, each question may have multiple solution suggestions but the solution suggestion that is presented to the user is retrieved based on the graph or problem that is currently being solved.

Another example of what a solution suggestion may contain may be considered in light of the question. If the question is, "Have the printer drivers been properly loaded?", then the answer may be "If not, then load the printer drivers from the support web site and then set the configuration to configuration A."

A check box or another marking field may be provided with the question, investigative statement, and/or solution suggestion and the user can fill the check box or marking field to let the model know that the user has addressed this question, investigative statement or solution suggestion. A user answer that has been entered can also be checked or marked in a similar fashion or the user answer may simply be detected as being used because a user answer was entered.

A question, investigative statement, user answer and/or solution suggestion that is used by a user can be used as a feature that is to be input to a machine learning model. A feature representing a question, investigative statement, user answer and/or solution suggestion can be input to a machine learning model in a binary form (e.g., used or not used) or the actual text for the question, investigative statement, user answer and/or solution suggestion can be submitted to the machine learning model. Then the system can suggest the next section group 124 based on the questions, statements, solution suggestions, and the user answers used or collected so far during the problem-solving session. For example, if a question of "Do you need a cloud provider has a good interface for machine learning?" leads to use of the solution suggestion of "Amazon, AWS", then the next section group that may be suggested by the machine learning model may be a section group about AWS that is surfaced based on the semantics of the solution suggestion.

A graph may be considered a grouping of sub-units rather than one single unit. The graph is arranged so that section groups 124, topical arguments, solution suggestions and user answers (the sub-units) can be linked into or used in multiple graphs addressing separate problems or issues. Accordingly, a section group 124 may be in multiple different graphs. For example, the graph may include a section group 124 that is a VPN section and the VPN section may stand on its own as a section group 124, but the section group 124 may fit into multiple different graphs. More specifically, some of the section groups 124 may have groups of topical arguments that are designed to be investigated together.

Placing the topical argument (e.g., questions and investigative statements) and user answers in separate nodes also allows the questions or statements and user answers to be weighted differently when used as inputs to a machine learning model. This separation allows the question or statement to be weighted heavier than the user answers as inputs (or features) because the questions are more important than user answers or other graph items in solving the problem or issue. In the past, expert style systems have put question and user answers in one node together for analysis, which does not place enough emphasis on the importance of the questions and investigative statements.

Each node containing a topical argument (e.g., question or statement node 112) may include meta data tags representing topics for section groups 124 from which the node descends and the topical problem statement 118 from which the node descends. Accordingly, each node collects or inherits the meta data or attributes from nodes above the node. In one example, the meta data can be attributes with a field name and values that are associated with nodes in the tree (e.g., parent 1=value1). Patterns may be optionally set for formatting the types that may be set for the attributes. The meta data tags in that node may be made available to be used in the machine learning process. Alternatively, instead of including meta data in the nodes, links may reference back to section groups 124 or the topical problem statement 118 and these linking references may be used to represent and access the meta data for each node as needed.

A tree structure or other connected graph structure for the graph may be created by graph edges 122 between a topical problem statement 118, section groups 124, question nodes, user answer nodes, solution suggestion nodes, or other graph nodes. The graph edges may be uni-directional in the case of a tree. However, in some graph configurations, the graph edges may be bi-directional or non-directional as desired.

A section group 124 that is a topical sub-part of the graph may also be represented in a node with edges to other nodes, such as topical arguments. The topical arguments may also be stored in a node and the topical arguments may be the questions and investigative statements used to solve the problem or clearly investigate the problem being analyzed. The question nodes and statement nodes 112 may be grouped into section groups 124 that are defined by a sub-topic description 128 in the section group 124 nodes. In addition, answer patterns (e.g., show me) and context description field (e.g., tell me) (as discussed further later in FIGS. 4A-4B) can each be included in an individual node and may be linked to the topical arguments.

A section group 124 with a sub-topic description 128 may be accessed by navigating or traversing through the graph 116 or tree structure using API requests from a client device 150 or a requesting service 154. The API requests may be generated by a user through an application or a graphical user interface 152. Another type of client device may be a requesting service 154 on another client device or server that requests graph data from an argument management service 140. The API requests from the clients may be made via an API interface 140 on the server 110 or a cloud service. The server 110 may be a virtualized server that is virtualized in a service provider environment or cloud environment (e.g., in Microsoft AZURE, Amazon AWS, etc.).

Every node in the graph is related to the topical problem statement 118, hypothesis, issue or goal. This provides a context for the topical arguments (questions and investigative statements), user answers, solution suggestions, and any supplemental information (i.e., comments and show me/tell me descriptions). More specifically, section groups 124 may also be linked in the graph to the topical problem statement 118 or subject matter area. As a result, the same groups of questions may have different contexts and different solution suggestions and user answers. For example, a question may be "How many data centers do you have?" then the solution suggestion presented or user answer collected for this question may depend on whether the user or application is in a section discussing "cloud resources" or "disaster recovery resources".

An argument management service 140 may track the use of the topical arguments, solution suggestions, user answers and other nodes in the graph using a node usage tracker 142. The node usage tracker 142 can track topical argument (e.g., question, investigative statement), solution suggestion and user answer usage by tracking access to the nodes containing these elements through API calls made from a graphical user interface 152 or a requesting service 154. The node usage may be tracked implicitly or explicitly. For example, a user's interaction with a user interface may be clicking on a user interface tree control to open a node to read the question or statement, and tracking the opening of the node may be considered implicit tracking. An example of explicit node use tracking is where a check box or other user interface control may be checked or activated by a user when the user reads or uses the question in the process of solving the expert problem.

A use pattern of topical arguments may then be identified using the pattern development logic 144. This service may identify a pattern of topical arguments used in a sub-part of a session or a pattern of topical arguments used since a session started. Tracking patterns of actual use means that the user does not have to explore a problem based on anecdotal ideas or instinct because the patterns created in the use data may lead to unexpected questions, investigative statements and section groups being selected via machine learning. The tracking of patterns in the use of questions, investigative statements, solution suggestions, and user answers can create data patterns that drive the selection of the next areas (e.g., section groups or topic arguments) for investigation by a user for the user's client. Sometimes the linkages between questions or statements may not be obvious to an agent but the root cause becomes clear using machine learning based on the usage of questions, topical statements, solution suggestions, and/or user answers over time. For example, the customer's presented problem may be a printing problem, but when a printing problem occurs there may be a high likelihood that a networking problem exists for the computing device which cannot print. The use of the tracked patterns for printing problems can then lead to the machine learning to surface questions and investigative statements for computer networking. This in turn leads to faster problem resolutions or lower average handling time (AHT). The term surfacing is defined here as bringing a section group or topical argument of the graph to the attention of a user (e.g., using highlight, listing first in a list or tree, etc.) or making it the next request node for a requesting service.

The use pattern may simply be a listing or collection of nodes visited during a problem-solving session without an ordering. For example, the use pattern may be an unordered list of topical arguments, user answers, solution suggestions, answer patterns and/or context description fields which may be submitted to machine learning processing or services. Alternatively, the use pattern may be a connected sub-graph representing nodes visited (e.g., topical arguments, user answers, solution suggestions, answer patterns and/or context description fields) and edges connecting the nodes. Such a sub-graph may also be processed by the machine learning processing.

The use pattern may be processed using the machine learning processing 146 and using a machine learning model 160 to process the use pattern to identify an expert pattern of use by an expert that defines the expert use of the topical arguments. The machine learning model may have been previously trained using machine learning training data 162 defining one or more experts' correct or desirable use of the graph for a topical problem. The expert patterns may be contained in the ML training data 162. The machine learning model used for processing may be based on a supervised learning process, an artificial neural network, random tree forests, an unsupervised learning process, a clustering process or other known machine learning models. More specifically, the use of random tree forests may work better on language and semantics than on other types of problem statements or graphs. As described above, the information submitted to the machine learning system may be a pattern that is represented by a sub-graph or by an unordered collection of features that may be submitted to the machine learning services.

As an example, the system can identify that multiple section groups and/or topical arguments have been used and the multiple sections groups and/or topical arguments (e.g., questions and investigative statements) may be used as features that are submitted to a machine learning model. The machine learning model can then select an output section group or block of the graph that may be presented to the human agent trying to solve the problem. As discussed earlier, the patterns or used data collected may be used as input features to machine learning models, such as a clustering, logistic regression or other machine learning models that may be used to surface a relevant section group, relevant questions or relevant investigative statements.

As discussed, an expert pattern for using the graph that is selected can be used by the topic argument management service 140 to present an additional section group 124 to an agent. The expert pattern can be used to provide the next most important topical arguments as defined by the expert pattern(s) to solve a problem based on what the expert did previously. A section group 124 of topical arguments can be presented as a sub-portion of a graph and be shown as a node in the graph or tree at the appropriate level in the tree. For example, a section group may be picked based on an order an expert used section groups in the graph or based on how much the expert user was engaged with selected section groups 124.

The additional section group 124 with topical arguments, questions, solution suggestions and user answers may be presented to the user. The additional section group 124 may be embedded in a graph presented in a graphical user interface. In one example, the machine learning may classify the use pattern to determine which additional section group to present in the graph in the user interface. In an alternative configuration, the machine learning may add a section group 124 to the graph that was not included in the graph previously. This section group 124 may be selected from a large pool of section groups 124 and adding the new section group 124 may expand the size of the graph and the graph's problem-solving power.

The topical argument presentation service 148 may format the section group 124 to be presented. If the section group is to be presented graphically, then the topical argument service 148 may format the section group(s) 124 for graphical presentation. If the section groups 124 are going to be provided to a requesting service 154, the section groups 124 may be formatted in a data transfer format for machine consumption. For example, the section group 124 may need to be joined together with other context data by a requesting service 154, such as IoT (internet of things) data, sensor data, weather data, location data, medical data, engineering data, automation data, manufacturing floor data, external reference data, or other data that can provide additional data with the section group 124 to assist with solving the problem. Additional section groups 124 can be either pushed to a client device or pulled by requests from the client device depending on the desired communication architecture.

Because the path of a user's traversal through a graph is recorded, this recorded path enables a summary of what the agent did during a problem-solving session to be automatically created. For example, a user or human agent working in a call center may be asked to create summaries and keep notes of every customer interaction. Using the present technology, the user may export a summary of their graph use path with topical arguments and user answers, comments, notes or related material, and this summary can be output in a text or other symbolic form to be stored with the session identifier. The user may further annotate the output summary as desired.

In the example case of a call center, an automatically generated summary may assist with improving call center notes and assist with providing follow-up care for a customer. The ability to create automated summaries also helps with standardizing the language and vocabulary used in the summaries. Each graph may use fixed topical arguments (questions and investigative statements), as a result the summaries for similar cases or problem-solving sessions may be more aligned and the vocabulary may be standardized by a single author (the author of the graph) on a single topic.

Another useful result of automatically generated summaries is that tier 2 agents or trouble shooters can quickly and easily see everything the first trouble shooter did in a standardized format. Otherwise the tier 2 agent (i.e., escalation agent) may make a customer angry because the tier 2 agent does not have a clear idea what was done by the tier 1 agent. In addition, the tier 2 agent can better understand what was done previously because the tier 1 and tier 2 agents are using the same model in the graph for solving the problem.

The graph itself may provide a deep roadmap or a deep investigative model of a topic and/or a problem to be solved. In some sense the graph may be a data listing of inquiry points for experts exploring a topic, problem to be solved, or issue to be addressed. Because expert knowledge is stored in the graph, others (e.g., users or agents) can use the inquiry points or ideas stored in the graph, via questions, statements, solution suggestions and user answers, to explore or solve problems that are similar to or identical to the problem for which the expert created the graph. As discussed earlier, portions of the model (e.g., section groups or topical arguments) may be brought to the surface when the right conditions are met by a user using the model (e.g., graph). There are nodes that may be surfaced based on patterns a user takes in consulting with a client or in solving a problem. Nodes may be surfaced dynamically because the terms in the nodes are similar to questions, statements and user answers currently being used, or a pattern of traversal may help identify a specific node to be selected and the specific node may be presented to the user. In simpler terms, question 1 often leads to the machine learning being able to identify question 2 or another section of questions.

This technology may provide an improved problem solving or exploration path for users using a graph as time goes by. For example, an expert may realize over time, by using the expert's personal insight, that there is a better place to start in a graph for a defined problem to be solved or a topic to be explored. If the expert always goes to a specific question or specific section group first in a graph, then the system can record that Expert 1 tends to jump to a specific question N first. As a result, the system can start to suggest that expert path (e.g., start at question N) to others using the graph. The system may use machine learning to anticipate what the user or agent may want to ask or investigate next. The data that is surfaced in a question lets a user know what question or investigative statement is considered to be a good next area or topical argument to explore.

The graph that is created for a specific problem to be solved or problem session can be a context graph based on a problem to be solved. The context the graph can provide in a tree structure or other graph structure may include: the topical problem statement 118 which describes the context of the entire tree, section groups 124 containing a listing of topical arguments or other sections, sub-topic section groupings which describe a sub-topic for a group of topical arguments, and solution suggestions which provide context for individual topical arguments. These contextual aspects for solving the problem or advising on a defined topic may be available when using the topical arguments. As a result, when a user uses the topical arguments, the user may either know the context for the topical arguments based on a graph the user selected, or the user can view the context for the topical arguments (e.g., view the topical problem statement 118, etc.) which assists the user in solving the problem.

The graphs of the present technology may enable an expert to improve the time for another trained but less expert person to solve the problem more quickly. For example, problem solving time may improve for users (i.e., individuals with less expertise than experts) by 20%-30% due to the expert guidance in using questions and investigative statements. For example, the present technology may be used to reduce call times at a call center and increase the number of problems solved in a defined time frame for the call center. Experts can also save time using their own graphs because the graph ensures that important questions or investigative statements are properly addressed and not missed.

Figure 2:
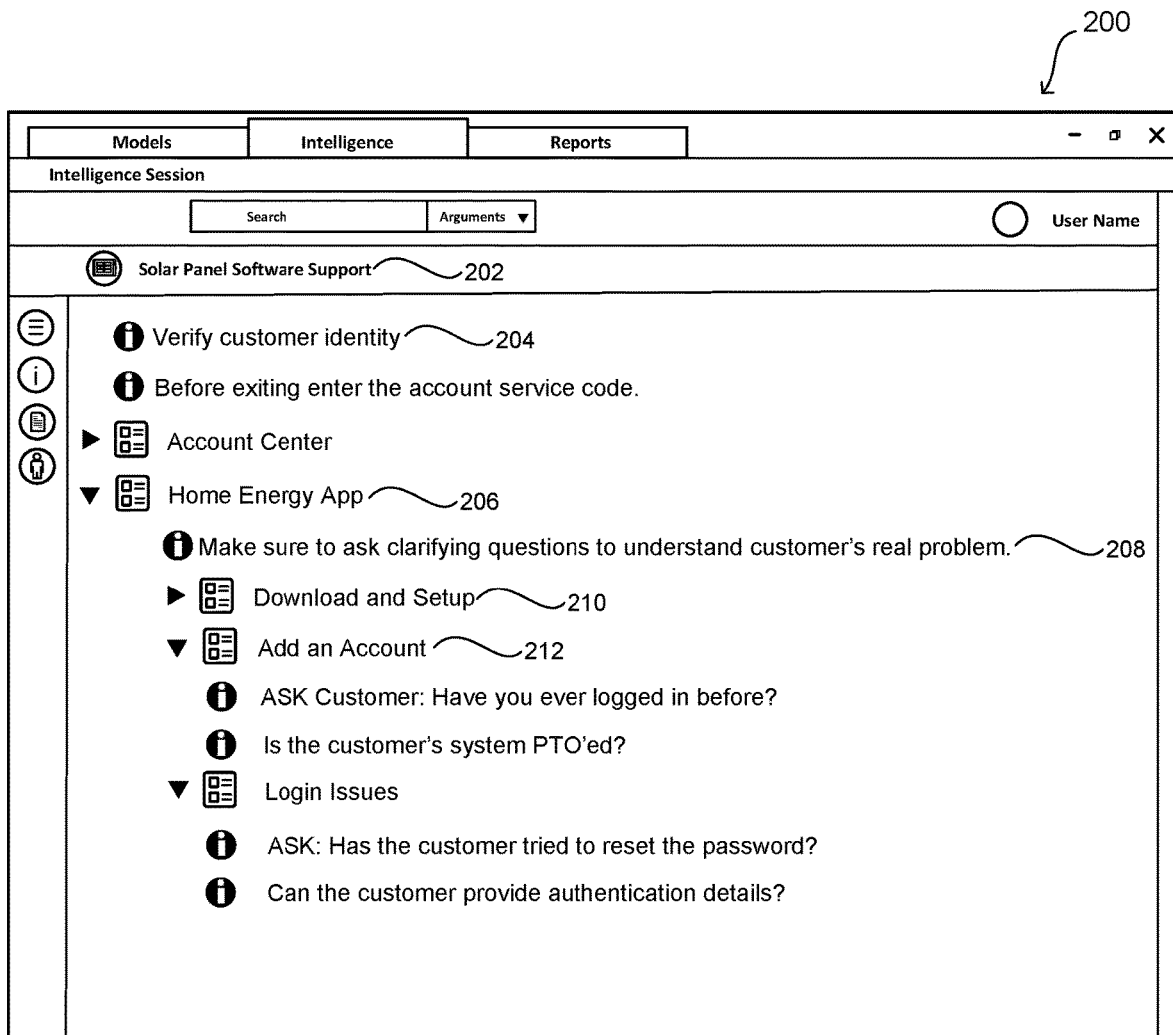
FIG. 2 illustrates an example client interface for interacting with topical arguments and user answers.

FIG. 2 illustrates an example client user interface 200 for interacting with topical arguments and user answers. The graphical user interface may display a topical problem statement 202. The topical problem statement 202 may be, for example, software technical support for a specific software application, technical support for a specific type of computer hardware (e.g., PC hardware), or questions to define a technical design for a cloud architecture. In another example, the topical problem statement may be in an area like medical diagnosis for cancer, heart problems, lung problems or other similar issues. In addition, the present technology may be used to assist with solving problems in other areas where deep expertise is needed, such as law, accounting, tax consulting, marketing, agriculture, medicine, engineering or other complex areas.

Some topical arguments 204 are illustrated as being tied to the root level of the graph. For example, specific items may be listed at the root of the graph or tree for a user to check when technical support is being started. The topical arguments 204 may be statements or questions the user can use to help start the process of solving the problem.

Section groups 206 may be provided to the user to assist with solving the problems, and the section groups 206 may have a sub-topic (e.g. Home Energy App). The initial section groups 206 that are provided may be default section groups in a graph created by an expert user or simply a list of possible section groups 206 from the graph by some other ordering.

As illustrated in FIG. 2, a section group 206 may have a title (e.g., "Home Energy Group") and one or more child section groups 210, 212 and/or topical arguments 208. The title may be the sub-topic or a sub-topic may be stored for the section group that is separate from the title. The section groups may group and link topical arguments that are questions or investigative statements that can be used by, for example: sales professionals to understand their customers' purchasing needs, engineers to help understand a customers' design requirements, cloud architects to define a virtualized environment for customer, tech support personnel and other types of individuals working in complex areas that can use assistance from well-defined topical arguments in a graph created by experts working a specific field of endeavor.

In a more specific example, a section group 212 may have topical arguments that are nodes that are connected to the section group 212. The topical arguments may be one or more questions such as "Has the user ever logged in before?" or "Does the user have two-part authentication?". In addition, the topical arguments may also be statements that lead the user to consider a certain point. For example, "Check the account record to make sure the record has not been corrupted."

A human administrator, agent, guide or user that uses the system may be presented with a library of the models or graphs to select from to solve a problem. Once the user selects the topic of the problem, then the graph may be made available to the user. The graph may define the section groups or sub-sections of questions, investigative statements, solution suggestions, user answers, etc. which will be presented to the user. As described, the graph (or question, statement and answer model) presented to the user may change dynamically as the user visits questions and statements because data is collected on the nodes used and this provides feedback as to what sections, sub-sections, questions, or investigative statements may be selected using machine learning to be presented to the user. For example, if the user enters a comment or user answer to a question about a specific symptom of the problem received from a client, then the section related to the symptom, as defined by machine learning, may be presented.

In one example, a client may state that the customer has lost their password or the password is not working. As the agent attempts to solve the problem, the questions and user answers that the agent is pursing may enable the machine learning to reveal that the real problem is not actually access but billing. So, the section on billing may be surfaced dynamically. This may eventually reveal that the customer has not paid their bill, and perhaps the customer wanted to enter their password but the customer had a different goal of paying the bill. So, the goal of logging into a system or obtaining access, may actually be to try to pay a bill. As the system collects user answers to questions or premises, then what gets presented to the user or agent trying to solve the problem may change. For example, questions on billing may result in a path to a technical issue.

Rather than having a single unchangeable master model stored in a graph as may have occurred in previous expert style systems, patterns can be found in the way the questions are visited and the user answers are collected to find better questions and premises. Then the system can dynamically present section groups or even dynamically change the graph to provide additional exploration ideas. As the aspects of the problem are revealed, the actual goal may change as more relevant section groups or topical arguments are selected and presented by the machine learning.

Figure 3:
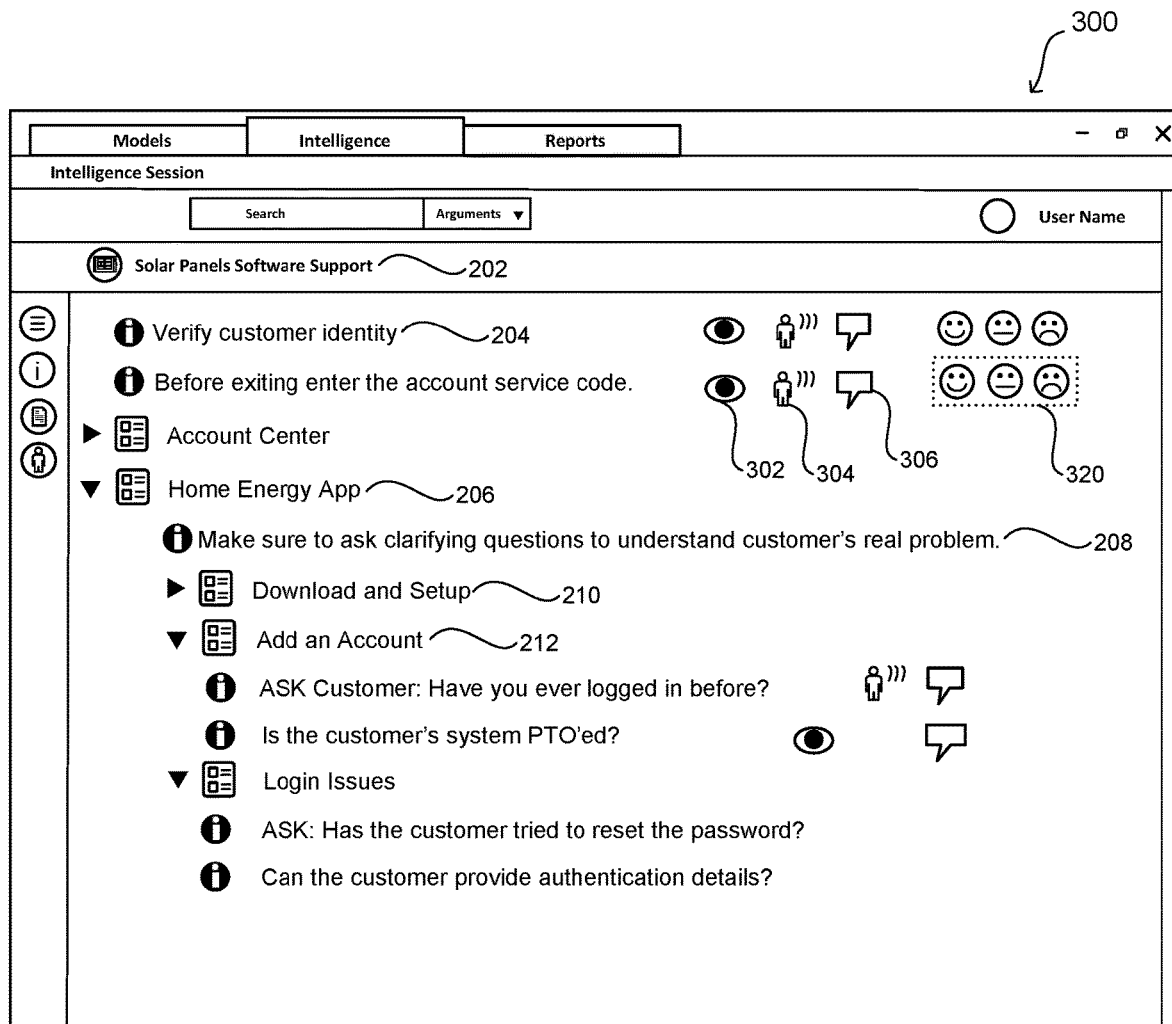
FIG. 3 illustrates an example graphical user interface with user interface controls for presenting answer patterns and context description fields for a topical argument.

FIG. 3 illustrates a graphical user interface 300 with user interface controls 302-306 for presenting answer patterns (e.g., show me statements) and context description fields (e.g., tell me) statements for topical arguments 204 associated with a topical problem statement 202 or a problem-solving session.

Users using a graph or subject matter experts can misinterpret a question or statement from the graph because there may be context needed to understand the question or statement. As a result, the subject matter expert can provide an answer pattern to a user who is using or considering a question. The answer pattern can provide an example of what an appropriate user answer or correct user answer from the customer will look like for the questions being asked. Thus, the answer pattern may show the user what a correct user answer from a client or customer may look like. As a result, a request to view an answer pattern made through an API or a user interface available to a user may be considered a "show me" user interface control 302. Use of the "show me" button can provide text, audio or other media describing what a user answer from a customer or client may preferably look like for the question being answered. The answer pattern helps provide a context for the user answer that the user is asking a client to provide a user answer for.

The system may also provide a context explanation field that explains why a user is asking this question. The context explanation field or "tell me" field may be accessed via a "tell me" user interface control 304. In addition, an expert may also be able to enter a custom comment 306 that is related to an investigative argument (e.g., question or statement) for any contextual item that is not covered by the answer pattern or the explanation field. Alternatively, the system may be configured to allow a user to enter a comment for a session with a client and that comment can be output with a log for the client session.

FIG. 3 also illustrates the ability to add positive and negative feedback for the topical arguments (questions and statements), user answers, solution suggestions, answer patterns and/or context description field (i.e., Show Me/Tell Me). The feedback can be provided by allowing a user to select a smiley face, neutral face or frowny face 320. Alternatively, feedback may be provided on a numerical scale (1-5 or 1-10), a simple like (thumbs up) or do not like (thumbs down) interface or another rating interface. The feedback icons may be in a location near the answer patterns or context description field. The feedback may apply to the topical arguments, user answers, solution suggestions, answer patterns and/or context description field depending on where the feedback interface is shown or what the feedback is linked to in the overall process. In an example configuration, when a user hovers over the answer pattern or context description field and a pop-up window is presented, the good, ok or bad icons may be presented which provides feedback to the author and to the system or process. This feedback may be used to contribute to the weight of that question, statement, user answer, solution suggestion, answer pattern and/or context description field in the context of the greater problem statement. Thus, the topical arguments, user answers, solution suggestions, answer patterns and/or context description field may be weighted when submitted to the machine learning processes depending on the feedback received from a user.

Figure 4A:
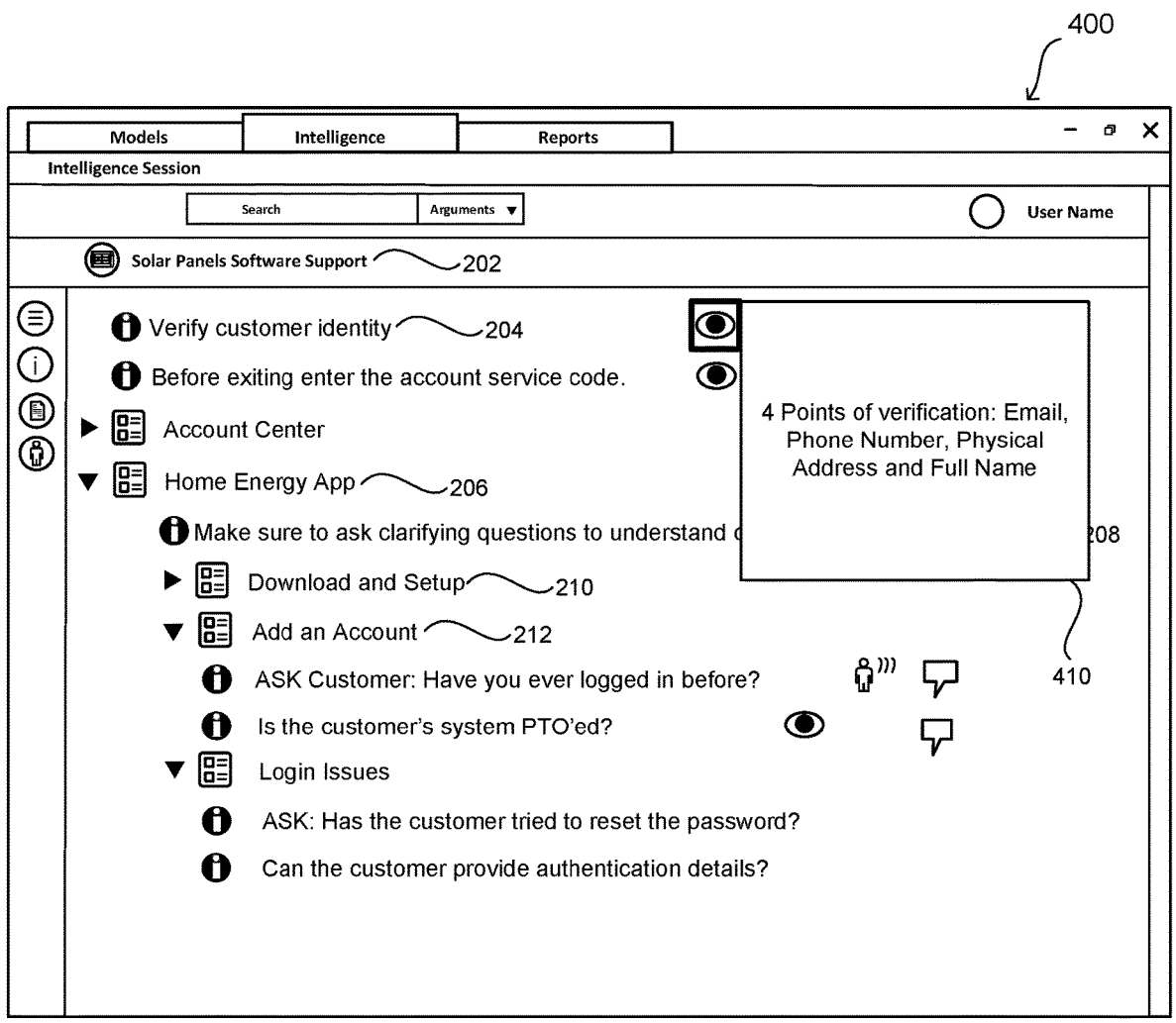
FIG. 4A illustrates an example graphical user interface with a pop-up window for presenting the answer patterns for a topical argument.
Figure 4B:
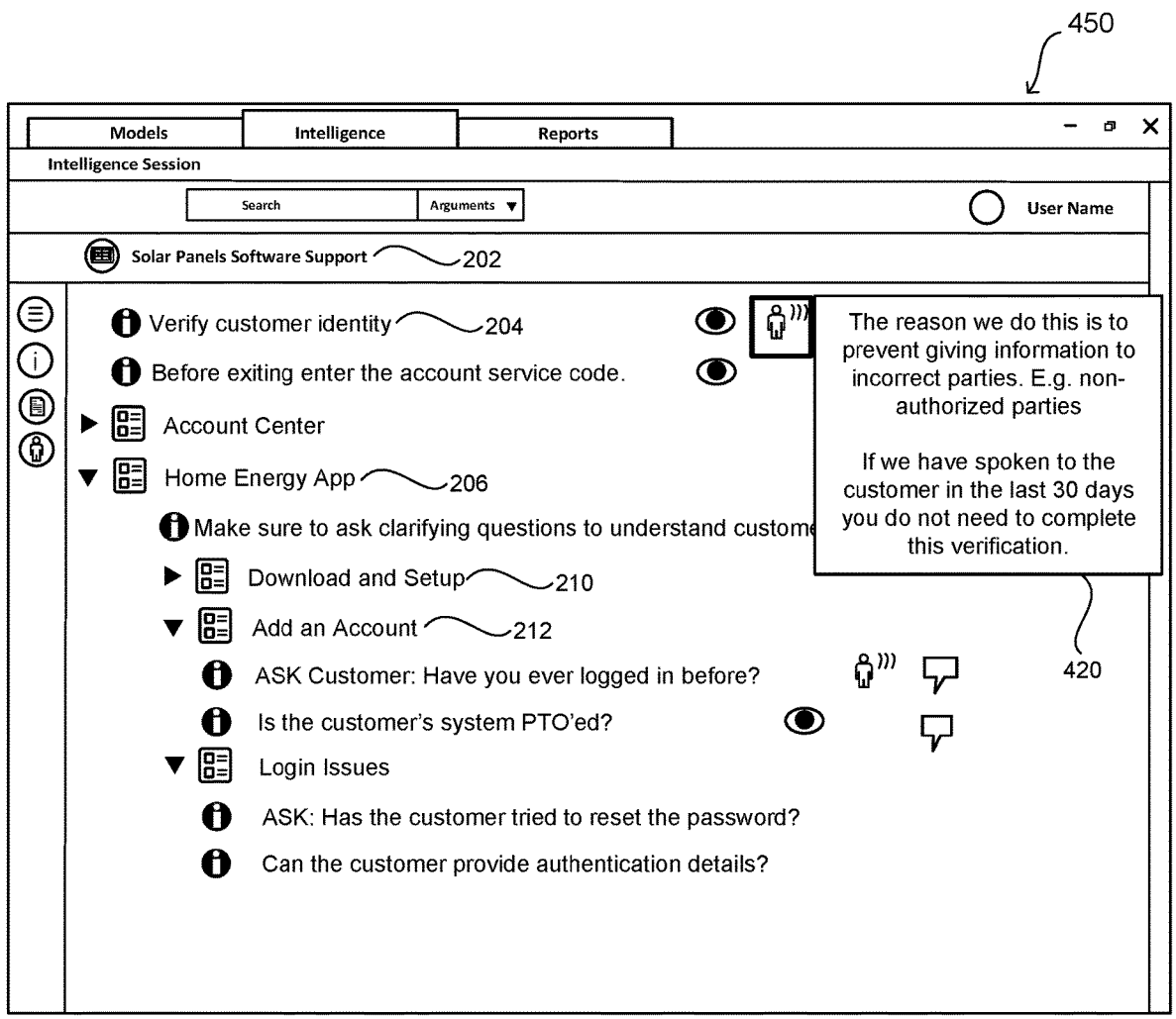
FIG. 4B illustrates an example graphical user interface with a pop-up window for presenting the context description fields for a topical argument.

FIG. 4A illustrates a graphical user interface 400 with a pop-up window, overlay window or slide-out window for presenting answer patterns 410 (e.g., show me statements). FIG. 4B illustrates a graphical user interface 450 with a pop-up window, overlay window or overlay window for presenting context explanation fields 420 (e.g., tell me statements) for a topical problem statement. The context explanation field may also be considered a goal statement for the topical argument (e.g., topical question or investigative statement) which explains a context for asking the question.

Linking a topical argument (e.g., a question or investigative statement) with an answer pattern that provides a "show me" description or an example of the format or pattern of a response that is desired to be obtained from a client provides a valuable context from the expert that would otherwise be unavailable to the user or agent. Context through the answer pattern field is useful because the answer pattern context represents expert experience that is joined together with important topical arguments to provide deeper and more real-world guidance for a user.

Similarly, with the context explanation field, linking the reason for pursuing a question or investigative statement (e.g., a "tell me" statement) explains the goal of the question to the user. This context about why the questions is being asked or the goal of the question provides deeper insight into the mental model which the expert is trying to layout for the user. The present technology is more than just a list of questions for a user that contains an example of what the user is scripted to be saying but rather the answer patterns and context explanation field provide the user with context as to why the user should be pursing the question or investigative statement. The more context that is available to the user, the more the user can understand the mental model of the expert who created the graph to assist the user with exploring the issue or solving the problem. This additional context and concrete perspective can also train the user over time and allow the user's understanding to become closer to the expert's understanding. This real understanding may in turn improve problem solution time and increase the chances that the user will actually solve the problem.

When a user or agent views, accesses, uses or marks the answer pattern and/or the context explanation field related to a topical argument, this use may be added to the use pattern being created by a user. The use of the answer pattern and/or context explanation field can also be used as inputs (e.g., the show me/tell me) to surface section groups or topical arguments (e.g., questions and investigative statements). When the answer pattern and context explanation fields are used to select and present additional section groups or topical arguments, the new section groups and topical arguments may be more questions about similar topics or additional sections groups may be surfaced to a user who seems to need more information about the specific area to solve the problem. In addition, the system may track what information related to a problem that a user does not know and the system may select or recommend education modules to a user for training. Use of the answer patterns or context description fields may also indicate who is not an expert on a particular topic and in contrast, users who do not need to use the answer patterns or context description fields may be considered to be more likely to be an expert in the area.

A different answer pattern or context explanation field (e.g., show me/or tell me) may also be shown with a topical argument depending on the topical argument, section grouping, topical problem statement, or context for which the topic argument was retrieved. More specifically, an answer pattern or context explanation field may be different depending on where the answer pattern or context explanation field is displayed in a graph, in a section group or the overall topic or sub-topic under which the answer patterns or context explanation fields are retrieved and presented.

In a more specific example, the question may be "Q: Can you ping the software through the support tool?" Then the context explanation field (e.g., "Tell Me" field) may state, "You are pinging the device to see if a port is open to be able to connect to the device." The subject matter expert is telling the user about why the user is asking the question or why the expert wants to ask the question. In addition, the expert may provide a location where the user can look for more information. Further, the expert's context explanation field may explain how this problem has been solved in the past.

In another example, the context explanation field may explain why the user is asking this question by explaining the reason why in the form of "If you know A, then you will also know B." Thus, the expert helps the user make an inferential leap using the question or investigative statement because the expert understands the context that the user may not otherwise know. When the user has been assisted in making these logical leaps, the user may be more easily able to make that leap again and understand the experts overall mental model.

Providing an answer pattern (e.g., a show me statement) allows an expert the opportunity to provide an example of a correct user answer from a client, when that user answer might not be obvious. For example, "Question: Ask a client if any of the data in the report correct." The expert may also provide an example answer pattern: "Answer: The parts inventory value is 10× too much. The sales price is correct but the inventory is not correct." Providing the answer pattern is valuable when a user or other experts see a question and the user or other experts are unsure of what user answer to expect from a client. In this example, the user or expert who did not create the graph understands where the look for the problem, namely in the area of calculations or similar problems.

Without an understanding of the context for the topical argument or question, the user or expert may completely skip asking the question because the user or other experts do not want to look like they do not understand the question or that the user or expert will not be able to continue conversation with the client after the question is asked. In addition, when the user or expert asking the question does not receive an answer that looks right based on the answer pattern, then the user or expert can ask the question differently because the additional information from the answer pattern helps them re-phrase the question using context. This additional context provided by the answer pattern helps the user or expert to have more empathy to the client's overall problem.

The context of the overall problem is important because experience and context shape a true expert's mental model. The reason why a user or expert is asking a question is useful in finding out the overall context for a problem. Allowing an expert who created the model or graph to explain why a question is being answered also allows the user to determine things like whether the client had a problem with this before or whether there is an overall a story for the problem? Both the answer pattern and the context explanation field extract a portion of the context of the problem or issue to be solved from an expert and stores portions of the context in individual elements that are consumable by a user or agent on a topical argument basis.

The structure of the graph breaks the problem down into smaller issues to address but also ties the context of the problem into the graph. The graph includes 1) the base problem to be solved, 2) sub-sections or section groups for the topical arguments (e.g., questions and investigative statements) about the problem to solve, 3) an example of an user answer to the question using the answer pattern, and 4) the reasons why the questions are being asked using the context description field.

Providing the answer pattern and context description field may assist with shortening training time for users or agents. The context description field provides a reason for asking each question that is associated with each question to be asked. The graph can provide detailed reasons why questions are being asked, as opposed to a user asking other humans who may forget why a question is being asked. As a further result, questions that may become old, irrelevant or are not useful can safely be removed from the graph because the reason why the question was in the graph to begin with is stored in the graph.

The graph may contain an answer pattern or context description field that is associated with a section group. This context data may be associated with a section group to annotate what types of more abstract issues may be explored in the section group. For example, a context description field may explain why a section exists and the higher-level goals to be explored in the section. Similarly, an answer pattern may define a sub-topic level answer pattern example to be obtained from the section, as opposed the question level answer pattern. This higher-level answer pattern may provide a higher meta level goal to a user or may be a good end level summary for a user to look at when all the topical arguments have been investigated to see if the goals of the section group have been met.

As discussed previously, the selection of a valuable question to be asked is important. Figuring out which question out of the many questions in the graph should be asked next makes this technology useful to a user. This technology helps an expert provide a graph full of topical arguments, and assists the user in making inferences and deductions using the questions, investigative statements, context associated with the answer patterns and context description fields attached to the topical arguments in the graph.

This technology may improve the responses of users, agents or individuals that are not as good as desired to make the users better (C to B players or B to A-players). Improving an entire team incrementally by enabling access to the mental model, topical arguments (e.g., questions and investigative statements), context (main topic, sub-topics, answer patterns, context descriptions) and experience of the experts provides great value to a group of users.

Experts are also able to effectively use the graph of topical arguments (e.g., questions and investigative statements), section groups of questions, answer patterns and additional context description fields (e.g., show me—tell me nodes) because the experts have at least a partial mental model of the topical subject matter and any additional question(s) from other experts can be used to help explore and expand the expert's current mental model of the topical subject matter.

Experts generally find that it is difficult to diagram complex subject matter or to create a linear flow diagram to explore highly complex subject matter (e.g., computer support, computing architectures, engineer topics, legal topics, medical topics, etc.). The graph provides topical arguments (questions and investigative statements), groupings of questions, answer patterns and context description fields (e.g., show me—tell me nodes) and these nodes may help provide a mental model of how an expert approaches a problem to be solved or an issue to be analyzed. Creating a graph in this manner is straight forward for an expert because the expert can put topics, sub-topics, questions, and investigative statements into buckets and sub-buckets. The present technology may not provide a final solution but the technology provides expert guidance to users or other more expert individuals regarding how to approach problem solving for a topic mostly through using questions and some statements. The graph that is built by the expert can then be given to another expert, partial expert or problem-solving user (i.e., human support).

Figure 5:
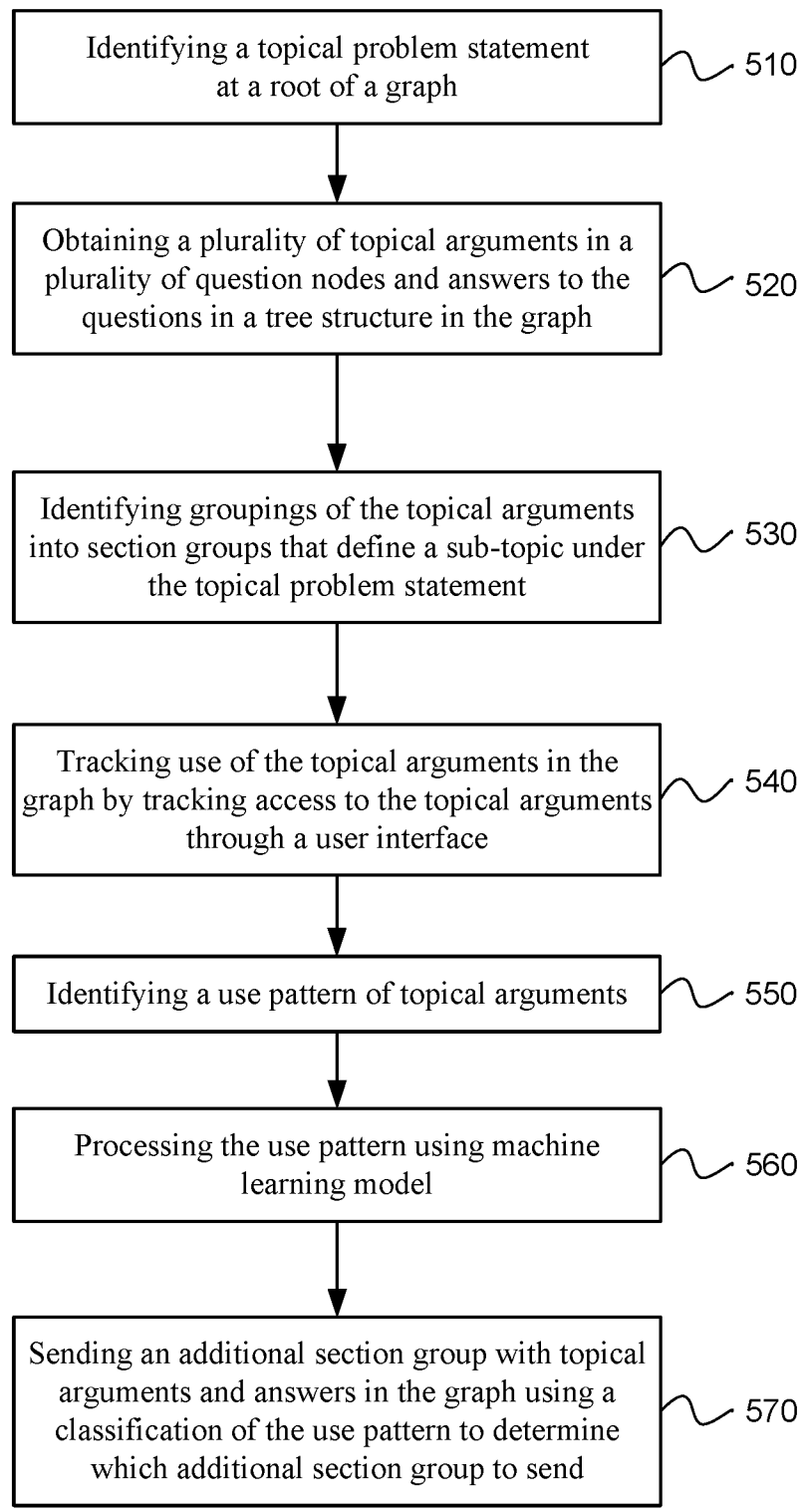
FIG. 5 is a flowchart illustrating an example of a method for identifying topical arguments to be presented to a user in order to enable the user to better solve a problem.

FIG. 5 illustrates a method for presenting or surfacing of new topical arguments during a problem-solving session for a particular topic. The method may be directed toward prioritizing or identifying topical arguments to be presented to a user in order to enable the user to solve a problem. For example, the topical arguments may be presented in a graphical user interface based on a priority selected by the machine learning (e.g., better matches are shown with a higher priority in a list or graph) or with a graphical emphasis in a user interface (e.g., highlighting or jumping to a section group). In another configuration, prioritized topical arguments or section groups with arguments may be sent in response to requests made through an API interface.

The method may include the operation of identifying a topical problem statement at a root of a graph, as in block 510. The topical problem statement may be "Trouble shooting computer hardware version A", for example. The topical arguments (topical questions and investigational statements) and user answers may each be stored separately in a node. A topical question may have more than one user answer in a user answer node associated with the topical question, and the appropriate user answer node can be displayed with a question in a graph depending on the graph being used or context in which the question node is displayed.

The graph may be considered a context graph because the graph is formed based on a problem to be solved or issue to be investigated (e.g., Issue: build a server specification), and additional portions of the context are defined by the section groups, the user answers, the answer patterns and the context description field (e.g., show me and tell me) portions of the graph. A section group of topical arguments may be considered a sub-portion of the context graph.

The problem or issue to be solved may be any expert problem or issue that is solved or addressed with the assistance of a user. For example, the expert problem may be: a computer support problem, a product support problem, a computer architecture problem, a technical specification issue, a technical support problem for a user who is making an in-bound telephone problem request, a shipping problem, a billing problem, an order problem or a technical trouble shooting problem.

A plurality of topical arguments may be obtained that are stored in each of a plurality of sections groups that group together topical arguments (e.g., question nodes and investigative statements) and user answer nodes that are user answers to the topical arguments in the graph, as in block 520. For example, the graph may be a tree structure. The question nodes may define questions that an expert would ask to solve the problem or statements that a user should investigate, solve to address the issue.

The question nodes may be grouped into section groups that define a sub-topic under the topical problem statement, as in block 530 and those groups may be identified. In one example, a user may navigate to a sub-topic using a graphical user interface and a graph display that appears in a visual listing format (e.g., a tree format). Alternatively, section groups may be sent in a data format in response to API calls from services, servers, or requesting devices.

The use of the topical arguments in the graph may be tracked by recording access to the topical arguments through a user interface, as in block 540. Use of the topical arguments may be tracked by recording when a topical argument is opened or selected. Alternatively, a user may explicitly select and/or mark a topical argument as having been used in the problem or issue solving process. For example, the use of topical arguments and user answers may be explicitly defined as a user checks a "use box" or otherwise graphically indicates use of a topical argument, user answer or section group.

A use pattern for topical arguments may be identified using the data from the recorded access to the topical arguments, as in block 550. The use pattern may simply be the topical arguments, solution suggestions or user answers used or accessed without a specific ordering which can be used as features for processing using machine learning. In another configuration, the use pattern may be created by creating a use sub-graph with nodes that were visited and in what ordering.

The use pattern may be processed using a machine learning model, as in block 560. For example, the use pattern may be used as input to select or find the closest expert pattern describing use of the graph by an expert using the topical arguments. The selection may be performed by using the topical arguments that have been identified as being used by a user during a specific time period of use. The selected expert pattern that is output may be used to select and provide the additional section group to solve a problem based on what the expert is predicted to use as identified in the expert pattern. Thus, the additional section group is presented to assist with solving the problem or issue using the questions, statements, solution suggestions and user answers in the section group.

In a different configuration, an additional section group with topical arguments and user answers from the graph may be identified and may be provided by using clustering, a classification, neural networks, random tree forests, or other machine learning processing of the use pattern to determine which additional section group to send, as in block 570. In another configuration, the additional section group may be presented in response to an API request.

In one configuration of the technology, a topical argument may have an associated example answer and a goal statement for each question. These example answers and goal statements may be changed based on a context of the topical problem statement or a section group within which questions or investigational statements are viewed.

In a further configuration, the graph may be a tree or hierarchical graph and the problem statement may be a root of the tree. The section groups may be branches in the tree and the topical arguments, investigational statements, solution suggestions and user answers may be branches or leaf nodes in the tree. In addition, an answer pattern (e.g., an example answer) and a context description field (e.g., a goal statement) may be leaf nodes of the tree. The example answer and goal statement may be leaves that extend from the topical arguments, user answers, and/or the section groups.

This technology provides processes and systems which can be used to create a diagnostic and analysis tool (e.g., an expert system) for any knowledge base for which questions can be created and the activity of an expert and users or human agents can be tracked. A business facing platform may be provided for a user or agent (rather than a data scientist) which can be used while directly interviewing a customer or another individual with a problem related to a specific topic. Non-engineering or non-scientific users or human agents can access an interface that provides powerful expert questions during customer interactions.

Figure 6:
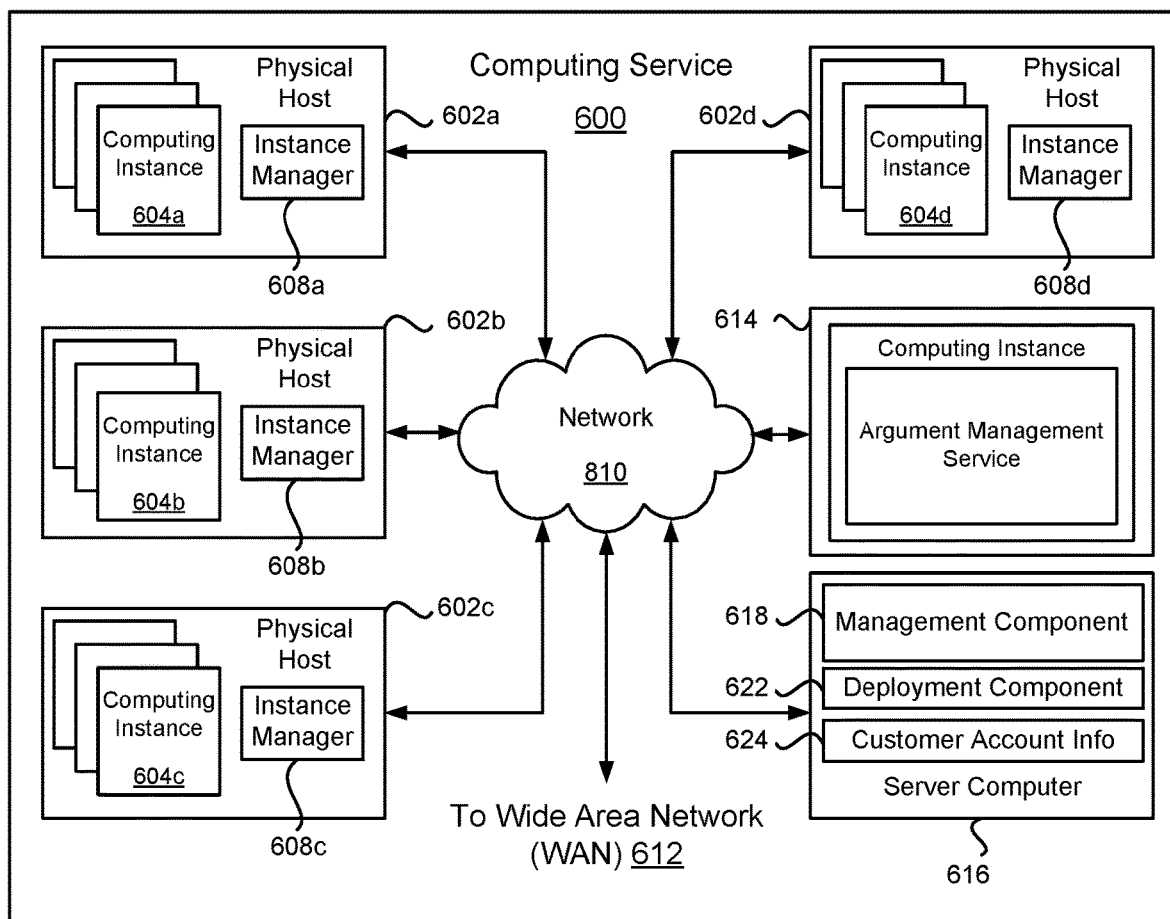
FIG. 6 is a block diagram illustrating an example service provider environment within which the services for identifying topical arguments to be presented to a user to better solve a problem may be executed.

FIG. 6 is a block diagram illustrating an example computing service 600 or service provider environment that may be used to execute and manage a number of computing instances 604a-d upon which the present technology may execute. In particular, the computing service 600 depicted illustrates one environment in which the technology described herein may be used. The computing service 600 may be one type of environment that includes various virtualized service resources that may be used, for instance, to host computing instances 604a-d.

The computing service 600 may be capable of delivery of computing, storage and networking capacity as a software service to a community of end recipients. In one example, the computing service 600 may be established for an organization by or on behalf of the organization. That is, the computing service 600 may offer a "private cloud environment." In another example, the computing service 600 may support a multi-tenant environment, wherein a plurality of customers may operate independently (i.e., a public cloud environment). Generally speaking, the computing service 600 may provide the following models: Infrastructure as a Service ("IaaS") and/or Software as a Service ("SaaS"). Other models may be provided. For the IaaS model, the computing service 600 may offer computers as physical or virtual machines and other resources. The virtual machines may be run as guests by a hypervisor, as described further below. The PaaS model delivers a computing system that may include an operating system, programming language execution environment, database, and web server.

Application developers may develop and run their software solutions on the computing service system without incurring the cost of buying and managing the underlying hardware and software. The SaaS model allows installation and operation of application software in the computing service 600. End customers may access the computing service 900 using networked client devices, such as desktop computers, laptops, tablets, smartphones, etc. running web browsers or other lightweight client applications, for example. Those familiar with the art will recognize that the computing service 600 may be described as a "cloud" environment.

The particularly illustrated computing service 600 may include a plurality of server computers 602a-d. The server computers 602a-d may also be known as physical hosts. While four server computers are shown, any number may be used, and large data centers may include thousands of server computers. The computing service 600 may provide computing resources for executing computing instances 604a-d. Computing instances 604a-d may, for example, be virtual machines. A virtual machine may be an instance of a software implementation of a machine (i.e. a computer) that executes applications like a physical machine. In the example of a virtual machine, each of the server computers 602a-d may be configured to execute an instance manager 608a-d capable of executing the instances. The instance manager 608a-d may be a hypervisor, virtual machine manager (VMM), or another type of program configured to enable the execution of multiple computing instances 604a-d on a single server. Additionally, each of the computing instances 604a-d may be configured to execute one or more applications.

A server 614 may be reserved to execute software components for implementing the present technology or managing the operation of the computing service 600 and the computing instances 604a-d. For example, the server 614 may include an argument management service as is illustrated in FIG. 1.

A server computer 616 may execute a management component 618. A customer may access the management component 618 to configure various aspects of the operation of the computing instances 604a-d purchased by a customer. For example, the customer may setup computing instances 604a-d and make changes to the configuration of the computing instances 604a-d.

A deployment component 622 may be used to assist customers in the deployment of computing instances 604a-d. The deployment component 622 may have access to account information associated with the computing instances 604a-d, such as the name of an owner of the account, credit card information, country of the owner, etc. The deployment component 622 may receive a configuration from a customer that includes data describing how computing instances 604a-d may be configured. For example, the configuration may include an operating system, provide one or more applications to be installed in computing instances 604a-d, provide scripts and/or other types of code to be executed for configuring computing instances 604a-d, provide cache logic specifying how an application cache is to be prepared, and other types of information. The deployment component 622 may utilize the customer-provided configuration and cache logic to configure, prime, and launch computing instances 604a-d. The configuration, cache logic, and other information may be specified by a customer accessing the management component 618 or by providing this information directly to the deployment component 622.

Customer account information 624 may include any desired information associated with a customer of the multi-tenant environment. For example, the customer account information may include a unique identifier for a customer, a customer address, billing information, licensing information, customization parameters for launching instances, scheduling information, etc. As described above, the customer account information 624 may also include security information used in encryption of asynchronous responses to API requests. By "asynchronous" it is meant that the API response may be made at any time after the initial request and with a different network connection.

A network 610 may be utilized to interconnect the computing service 900 and the server computers 602a-d, 616. The network 610 may be a local area network (LAN) and may be connected to a Wide Area Network (WAN) 612 or the Internet, so that end customers may access the computing service 600. In addition, the network 610 may include a virtual network overlaid on the physical network to provide communications between the servers 602a-d. The network topology illustrated in FIG. 6 has been simplified, as many more networks and networking devices may be utilized to interconnect the various computing systems disclosed herein.

Figure 7:
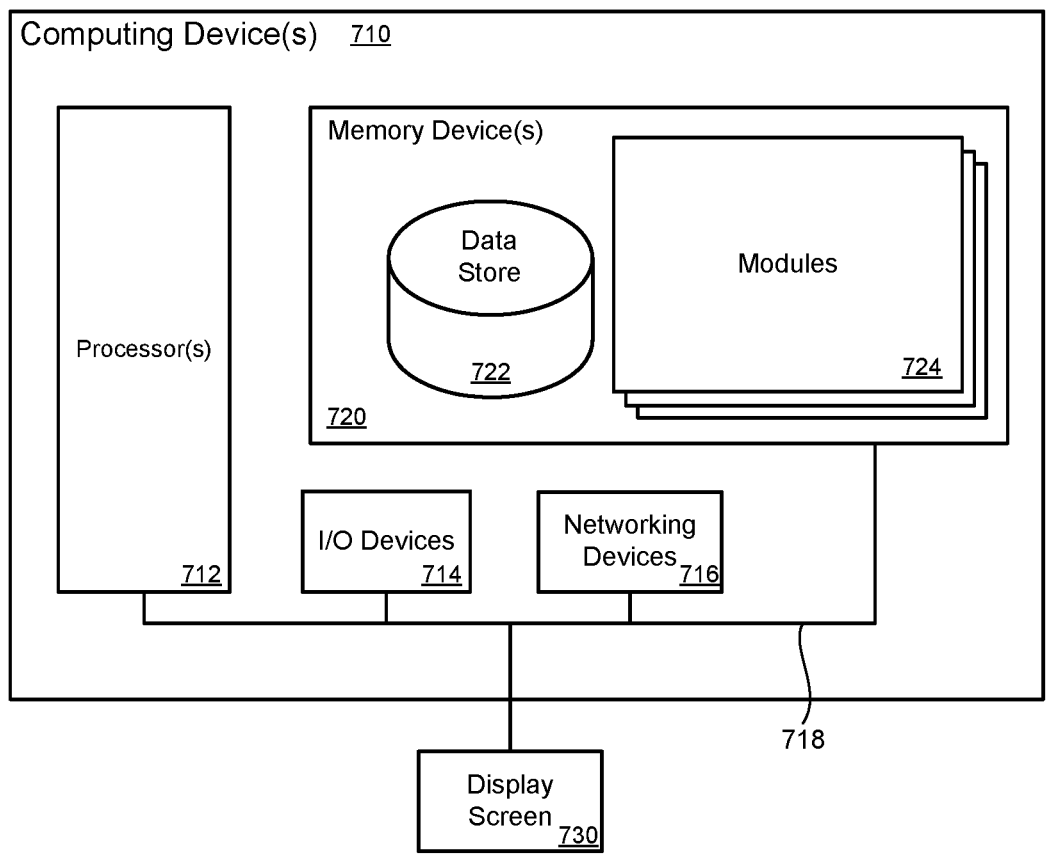
FIG. 7 is a block diagram illustrating an example of a computer system on which the technology may execute.

FIG. 7 illustrates a computing device 710 on which modules of this technology may execute. The computing device 710 is illustrated on which a high-level example of the technology may be executed. The computing device 710 may include one or more processors 712 that are in communication with memory devices 720. The computing device may include a local communication interface 718 for the components in the computing device. For example, the local communication interface may be a local data bus and/or any related address or control busses as may be desired.

The memory device 720 may contain modules 724 that are executable by the processor(s) 712 and data for the modules 724. The modules 724 may execute the functions described earlier. A data store 722 may also be located in the memory device 720 for storing data related to the modules 724 and other applications along with an operating system that is executable by the processor(s) 712.

Other applications may also be stored in the memory device 720 and may be executable by the processor(s) 712. Components or modules discussed in this description that may be implemented in the form of software using high programming level languages that are compiled, interpreted or executed using a hybrid of the methods.

The computing device may also have access to I/O (input/output) devices 714 that are usable by the computing devices. An example of an I/O device is a display screen that is available to display output from the computing devices. Other known I/O device may be used with the computing device as desired. Networking devices 716 and similar communication devices may be included in the computing device. The networking devices 716 may be wired or wireless networking devices that connect to the internet, a LAN, WAN, or other computing network.

The components or modules that are shown as being stored in the memory device 720 may be executed by the processor 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor. The executable program may be stored in any portion or component of the memory device 720. For example, the memory device 720 may be random access memory (RAM), read only memory (ROM), flash memory, a solid-state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface 718 may be used as a network to facilitate communication between any of the multiple processors and multiple memories. The local interface 718 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

The invention claimed is:

1. A method for identifying topical arguments to be provided in order to enable problem solving, comprising:
   identifying a topical problem statement at a root of a graph;
   obtaining a plurality of topical arguments in a plurality of argument nodes and user answers to the topical arguments in the graph;
   identifying groupings of the argument nodes into section groups that define a sub-topic linked by the graph to the topical problem statement;
   tracking use requests for the topical arguments in the graph by tracking access to the topical arguments;
   identifying a use pattern of topical arguments by tracking use requests to the topical arguments;
   processing the use pattern using a machine learning model; and
   sending an additional section group with topical arguments and user answers in the graph based in part on processing of the use pattern by the machine learning model to determine which additional section group to send to a requestor.

2. The method as in claim 1, further comprising:
   matching the use pattern to an expert pattern of use created by an expert using the topical arguments; and
   presenting the additional section group to solve a problem based on nodes in the graph the expert has used.

3. The method as in claim 1, building a graph that is a context graph based on a problem to be solved.

4. The method as in claim 3, wherein a section group of topical arguments is a sub-graph of the context graph.

5. The method as in claim 1, wherein the problem to be solved is at least one of: a computer support problem, a computer architecture problem, a technical support problem for a user who is making an in-bound telephone problem request, or a technical trouble shooting problem.

6. The method as in claim 1, wherein the topical arguments and user answers are each stored in a separate node.

7. The method as in claim 1, wherein each node containing a topical question includes meta data tags or links representing topics for section groups from which the node descends and the topical problem statement from which the node descends.

8. The method as in claim 1, wherein the topical arguments are at least one of: topical questions or investigational statements.

9. The method as in claim 1, further comprising retrieving an example answer and a goal statement for each question based on a context of the topical problem statement or a section group.

10. The method as in claim 1, wherein the graph is a tree, the problem statement is a root of the tree, the section groups are branches in the tree, and the topical arguments, investigational statements and user answers are leaf nodes in the tree.

11. The method as in claim 10, wherein an example answer and a goal statement are leaf nodes of the tree.

12. The method as in claim 1, wherein the machine learning model is based on a supervised learning process, an artificial neural network, or unsupervised learning comprising: a clustering process.

13. The method of claim 1, further comprising:
   collecting the user answer to a question;
   storing the user answer in a node with a link to the graph; and
   submitting the user answer to the machine learning model to identify an additional section group with topical arguments to be presented.

14. The method of claim 1, further comprising enabling navigation of a tree to the sub-topic using a graphical user interface.

15. A system, comprising:
   at least one processor;
   a memory device including instructions that, when executed by the at least one processor, cause the system to:
   store a topical problem statement at a root of a graph, and a plurality of topical arguments in a plurality of question nodes and user answer nodes as the topical arguments in a tree structure in the graph;
   grouping the question nodes into section groups that define a sub-topic under the topical problem statement, wherein the sub-topic may be navigated to using a graphical user interface;
   tracking use of the topical arguments in the graph by tracking access to the topical arguments through a user interface;
   identifying a use pattern of topical arguments;
   processing the use pattern using a machine learning model to match the use pattern to an expert pattern of use by an expert using the topical arguments and presenting an additional section group to solve a problem based on what the expert is predicted to use; and
   presenting an additional section group with topical arguments and user answers in the graph in the user interface using a classification of the use pattern to determine which additional section group to present in the graph in the user interface.

16. The system as in claim 15, building a graph that is a context graph based on a problem to be solved, wherein the topical problem statement, sub-topic groupings, and user answers provide context for the problem to be solved using the topical arguments.

17. The system as in claim 15, further comprising providing an answer pattern node that includes an example answer which describes a pattern for a user answer to be received from a client for a topical argument.

18. The system as in claim 15, further comprising a context description field that describes a goal statement for an associated topical argument.

19. A non-transitory machine readable storage medium including instructions embodied thereon, wherein the instructions, when executed by at least one processor:
   store a topical problem statement at a root of a graph, and a plurality of topical arguments in a plurality of question nodes and user answers to the arguments in a tree structure in the graph;
   grouping the question nodes into section groups that define a sub-topic under the topical problem statement, wherein the sub-topic may be navigated to using a graphical user interface;

tracking use of the topical arguments in the graph by tracking access to the topical arguments through a user interface;

identifying a use pattern of topical arguments;

processing the use pattern using a machine learning model to match the use pattern to an expert pattern of use by an expert using the topical arguments and presenting an additional section group to solve a problem based on what the expert is predicted to use, wherein a sub-topic description provides a context for a section group that relates to solving an expert problem; and sending an additional section group with topical arguments and user answers in the graph to a requestor defined using a classification of the use pattern to determine which additional section group to present in the graph in the user interface.

20. The non-transitory machine readable storage medium of claim 19, further comprising:

collecting a user answer to a question;

storing the user answer in a node; and submitting the user answer to the machine learning model to identify an additional section group with topical arguments to be presented.

\* \* \* \* \*